(12) United States Patent
Mizutani et al.

(10) Patent No.: US 8,941,533 B2
(45) Date of Patent: Jan. 27, 2015

(54) METHOD AND DEVICE FOR DETECTING AZIMUTH

(75) Inventors: Akiyoshi Mizutani, Kasugai (JP); Kento Nakabayashi, Anjo (JP); Kazuma Natsume, Obu (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 13/153,677

(22) Filed: Jun. 6, 2011

(65) Prior Publication Data

US 2011/0298653 A1 Dec. 8, 2011

(30) Foreign Application Priority Data

Jun. 4, 2010 (JP) ................................. 2010-129200

(51) Int. Cl.
*G01S 13/06* (2006.01)
*G01S 13/32* (2006.01)
*G01S 13/48* (2006.01)
*G01S 3/74* (2006.01)

(52) U.S. Cl.
CPC ................ *G01S 13/32* (2013.01); *G01S 13/48* (2013.01); *G01S 3/74* (2013.01)
USPC ........... 342/153; 342/147; 342/368; 342/372; 342/70

(58) Field of Classification Search
CPC  G01S 13/931; G01S 13/4463; G01S 13/4418
USPC .............. 342/80–83, 147, 149, 155, 445, 446
See application file for complete search history.

(56) References Cited

U.S. PATENT DOCUMENTS

| 5,229,774 | A  | * | 7/1993  | Komatsu ........................... 342/70 |
| 6,246,359 | B1 | * | 6/2001  | Asano et al. .................... 342/158 |
| 7,088,286 | B2 | * | 8/2006  | Natsume et al. ............... 342/147 |
| 7,196,656 | B2 | * | 3/2007  | Shirakawa ..................... 342/147 |
| 7,372,402 | B2 | * | 5/2008  | Numminen .................... 342/360 |
| 7,436,358 | B2 | * | 10/2008 | Tanaka ........................... 342/417 |
| 7,760,134 | B2 | * | 7/2010  | Morinaga et al. ............. 342/175 |
| 2006/0132353 | A1 | * | 6/2006 | Natsume et al. ............... 342/147 |

(Continued)

FOREIGN PATENT DOCUMENTS

| JP | 2000-180538 | 6/2000 |
| JP | 2000-193738 | 7/2000 |

(Continued)

*Primary Examiner* — John B Sotomayor
*Assistant Examiner* — Marcus Windrich
(74) *Attorney, Agent, or Firm* — Harness, Dickey & Pierce, PLC

(57) ABSTRACT

A device for detecting an azimuth has a transmission array antenna having plural transmission antenna elements arrayed along an array axis and a receiving array antenna having plural receiving antenna elements arrayed along the array axis. A reception signal is acquired for each of channels by transmitting and receiving a search wave through each of the channels. The channels are arbitrary combinations of each of the transmission antenna elements and each of the receiving antenna elements. A first spatial frequency analysis is performed along the array axis of either ones of the transmission antenna elements and the receiving antenna elements using the reception signal. A second spatial frequency analysis is then performed along the array axis of the other ones of the antenna elements using results of the first spatial frequency analysis. An azimuth of a target is determined based on analysis results from the second spatial frequency analysis.

17 Claims, 7 Drawing Sheets

(56) References Cited

U.S. PATENT DOCUMENTS

| | | | |
|---|---|---|---|
| 2006/0145919 A1* | 7/2006 | Pleva et al. | 342/368 |
| 2006/0158369 A1* | 7/2006 | Shinoda et al. | 342/70 |
| 2008/0291088 A1* | 11/2008 | Nagai | 342/374 |
| 2009/0046000 A1* | 2/2009 | Matsuoka | 342/147 |
| 2009/0303107 A1* | 12/2009 | Ando | 342/146 |
| 2010/0045507 A1 | 2/2010 | Yamano et al. | |
| 2010/0225523 A1 | 9/2010 | Mizutani et al. | |

FOREIGN PATENT DOCUMENTS

| | | |
|---|---|---|
| JP | 4238375 | 1/2009 |
| JP | 2008-241702 | 9/2010 |
| JP | 2010-203980 | 9/2010 |

\* cited by examiner

FIG.6A

|  | AT$_1$ | AT$_2$ | AT$_3$ | AT$_4$ | RECEPTION-SIDE-FIXED CHANNEL GROUP |
|---|---|---|---|---|---|
| AR$_1$ | CH$_{11}$ | CH$_{21}$ | CH$_{31}$ | CH$_{41}$ | → TG$_1$ |
| AR$_2$ | CH$_{12}$ | CH$_{22}$ | CH$_{32}$ | CH$_{42}$ | → TG$_2$ |
| AR$_3$ | CH$_{13}$ | CH$_{23}$ | CH$_{33}$ | CH$_{43}$ | → TG$_3$ |
| AR$_4$ | CH$_{14}$ | CH$_{24}$ | CH$_{34}$ | CH$_{44}$ | → TG$_4$ |

FIG.6B

|  | BIN$_1$ | BIN$_2$ | BIN$_3$ | BIN$_4$ |
|---|---|---|---|---|
| TG$_1$ | | | | |
| TG$_2$ | | | | |
| TG$_3$ | | | | |
| TG$_4$ | | | | |

METHOD AND DEVICE FOR DETECTING AZIMUTH

CROSS-REFERENCE TO RELATED APPLICATION

This application is based on and claims the benefit of priority from earlier Japanese Patent Application No. 2010-129200 filed Jun. 4, 2010, the description of which is incorporated herein by reference.

BACKGROUND OF THE INVENTION

1. Field of the Invention

The present invention relates to a method and device for detecting azimuth (i.e., azimuth direction, orientation, or direction) of a target based on a reflected wave from the target received by a plurality of receiving antennas.

2. Description of the Related Art

Conventionally, a radar device, called a phase-monopulse radar device, is known in which a plurality of receiving antennas receive a reflected wave emitted from a transmitting antenna and returned by being reflected by a target, and an azimuth of the target is detected from a shift in phase (in other words, phase difference) of a receiving signal at each receiving antenna.

However, when the azimuth is detected using phase difference, so-called aliasing (ambiguity) occurs based on the inability to differentiate between phase differences $\Delta\phi$ and $\Delta\phi+360°$. Therefore, a problem occurs in that the azimuth can only be uniquely identified within a range in which the phase difference changes 360° (such as $-180°<\Delta\phi\leq180°$).

Therefore, a method is proposed in which, through use of a plurality of transmitting antennas each having a different beam directivity, and successive switching between the transmitting antennas, an azimuth detection range is widened using information (direction and beam width) regarding a transmission beam that has been used, and whether a detection result is attributed to reflection by a target or to aliasing is judged (refer to, for example, Japanese Patent No. 4238375).

However, when a plurality of transmitting antennas each having a different beam directivity are used, the directions of the transmitting antennas are required to be precisely decided, and a problem occurs in that manufacturing becomes difficult.

In addition, when application to an actual machine is considered, use of an electronic scanning method can also be considered in which, using an array antenna in which antenna elements are arrayed on a same plane instead of a plurality of antennas each having a different beam directivity, the direction of a transmission beam is changed by changing the phase of the transmission signal supplied to each antenna element configuring the array antenna and the like.

In this instance, as a phase controller that changes the phases of the transmission signals supplied to the array antenna, a phase shifter, a Rotman lens, a Butler matrix, and the like are known.

However, a problem occurs in that actualization of these phase controllers is difficult in terms of performance and cost.

SUMMARY

Hence, it is desired to provide a method and device for detecting azimuth which are capable of obtaining a widened azimuth range using a simpler configuration.

An azimuth detecting device of the present disclosure that has been made to achieve the above-described object includes a transmission array antenna composed of a plurality of transmission-side antenna elements arrayed along an array axis set in advance and a receiving array antenna composed of a plurality of reception-side antenna elements arrayed along the array axis. A signal acquiring means acquires a reception signal for each channel by transmitting and receiving a search wave (i.e. a beam of continuous waves for searching) using the channel, the channel being an arbitrary combination of a transmission-side antenna element and a reception-side antenna element.

Then, an analyzing means performs a first spatial frequency analysis along one element array of the transmission-side antenna elements and the reception-side antenna elements using the reception signal acquired by the signal acquiring means, and performs a second spatial frequency analysis (in other words, a two-dimensional frequency analysis) along the other element array of the transmission-side antenna elements and the reception-side antenna elements using results of the first spatial frequency analysis. In adherence to the analysis results, an azimuth calculating means determines an azimuth of a target that has reflected the search wave.

As the spatial frequency analysis, for example, a beam former may be used or a high-resolution processing such as multiple signal classification (MUSIC: Multiple Signal Classification) may be used.

In the spatial frequency analysis performed along the element array of the reception-side antenna elements, detection of an arrival direction of radio waves is performed by characteristics determined by placement of the reception-side antenna elements. In the spatial frequency analysis performed along the element array of the transmission-side antenna elements, detection of an arrival direction of radio waves is performed by characteristics determined by placement of the transmission-side antenna elements.

In the azimuth detecting device of the present disclosure configured as described above, processing equivalent to transmission beam switching is actualized without use of a phase controller by the spatial frequency analysis along the element array of the transmission-side antenna elements. Therefore, widening of an azimuth detection range can be actualized by a simple configuration.

In addition, in the azimuth detecting device of the present disclosure, as a result of two-dimensional frequency analysis being performed, azimuth is detected from a result of a combination of two characteristics determined based on the placement of the transmission-side antenna elements and the placement of the reception-side antenna elements. Therefore, for example, in the beam former, an effect of narrowing beam width is achieved, and resolution of azimuth detection can be improved.

The plurality of transmission-side antenna elements and the plurality of reception-side antenna elements may each be arrayed such as to be evenly spaced or unevenly spaced.

When the antenna elements are arrayed such as to be unevenly spaced, the azimuthal width required to change phase difference by 360° differs with each antenna element combination. Therefore, generation of grating lobes, and thus, the occurrence of aliasing can be suppressed.

In addition, when the antenna elements are arrayed such as to be evenly spaced, the placement spacing of the transmission-side antenna elements and the placement spacing of the reception-side antenna elements are preferably set such that, with the azimuthal width enabling detection of azimuth in the azimuth detecting device as a detection range, an azimuthal difference between a main lobe and a grating lobe of the transmission array antenna is the detection range or more.

In this instance, the detection range can be widened to its maximum, while suppressing the effect of the grating lobe (aliasing of target outside of the detection range) of the transmission array antenna from appearing within the detection range.

The detection range may be set to a unit azimuthal width multiplied by a positive integer, the unit azimuthal width being an azimuthal width required to change the phase difference of reception signals obtained from adjacent reception-side antenna elements by 360°, or conversely, may be narrower than the unit azimuthal width.

In addition, in the azimuth detecting device of the present disclosure, the transmission array antenna and the receiving array antenna may be configured by a single array antenna.

In this instance, size required for the antenna is halved, and further simplification of the configuration can be actualized.

In addition, the signal acquiring means may be configured to operate the plurality of transmission-side antenna elements by time-division.

However, in this instance, for some time after switching of the transmission-side antenna elements, the receiving-side antenna elements may receive reflected wave based on a search wave transmitted from the transmission-side antenna element before switching.

Therefore, when channel switching accompanying transmission-side antenna element switching is performed, the signal acquiring means preferably waits for an amount of waiting time set to be longer than an amount of time required for the search wave to travel a maximum detection distance set in advance and back, and then starts acquisition of the reception signal for the channel after switching.

BRIEF DESCRIPTION OF THE DRAWINGS

In the accompanying drawings:

FIG. 5 is an explanatory diagram of transmission and reception timings of a radar wave and the like;

FIG. 6A and FIG. 6B are explanatory diagrams of a relationship between channels and data used in a spatial frequency analysis process;

DETAILED DESCRIPTION OF THE PREFERRED EMBODIMENTS

With reference to the accompanying drawings, a device for detecting azimuth, to which the present invention is applied, will now be detailed as various embodiments. In the following, the device according to the present invention is reduced into practice as an azimuth detecting device. The term "azimuth" is also called as azimuth direction, orientation, or simply direction.

Referring to FIGS. 1-7, the azimuth detecting device according to a first embodiment of the present invention will now be described.

Figure 1:
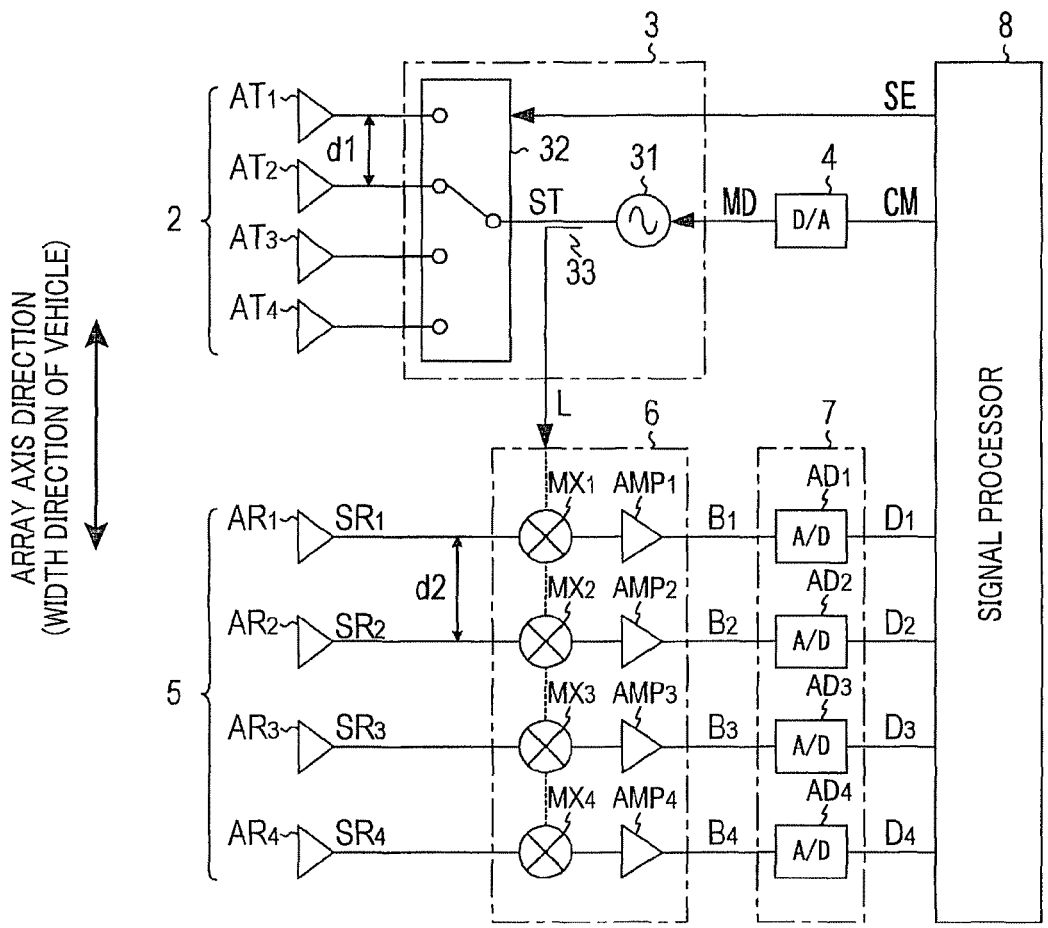
FIG. 1 is a block diagram of an overall configuration of a radar device according to a first embodiment.

FIG. 1 is a block diagram of an overall configuration of a radar device 1 for a vehicle to which the present invention is applied. In the present embodiment, the radar device, i.e., the device for detecting the azimuth from the vehicle, is mounted on the vehicle. Hence, the outside field of the vehicle can be defined as a field in which the azimuth is detected.

As shown in FIG. 1, the radar device 1 includes: a transmission array antenna 2 composed of an M-number (M=4 according to the first embodiment) of antenna elements (also referred to, hereinafter, as "transmission-side antenna elements") $AT_1$ to $AT_M$ arranged in a single row; a digital-to-analog (DA) converter 4 that generates a modulation signal MD in adherence to a modulation command CM; and a transmitter 3 that transmits a millimeter-waveband radar wave as a search wave (i.e. a beam of continuous waves for searching) modulated by the modulation signal MD, via the transmission array antenna 2.

The radar device 1 also includes: a receiving array antenna 5 composed of an N-number (N=4 according to the first embodiment) of antenna elements (also referred to, hereinafter, as "reception-side antenna elements") $AR_1$ to $AR_N$ arranged in a single row, and that receives a radar wave (referred to, hereinafter, as a reflected wave) transmitted from the transmitter 3 and reflected by a target, such as a preceding vehicle or a road-side object; an N-channel receiver 6 that generates beat signals $B_1$ to $B_N$ from reception signals $SR_1$ to $SR_N$ from the receiving array antenna 5; an analog-to-digital (AD) converting section 7 composed of an N-number of AD converters $AD_1$ to $AD_N$ that respectively sample the beat signals $B_1$ to $B_N$ generated by the receiver 6 and convert the sampled beat signals $B_1$ to $B_N$ to digital data $D_1$ to $D_N$; and a signal processor 8 that performs various types of signal processing based on the digital data $D_1$ to $D_N$ loaded via the AD converting section 7.

(Antenna)

In both transmission array antenna 2 and receiving array antenna 5, a vehicle width direction (horizontal direction) serves as an array axis, and respective antenna elements are arrayed along the array axis.

In addition, the transmission-side antenna elements $AT_1$ to $AT_M$ are arrayed at equal intervals d1, and the reception-side antenna elements $AR_1$ to $AR_N$ are also arrayed at equal intervals d2 differing from the intervals d1.

Figure 2:
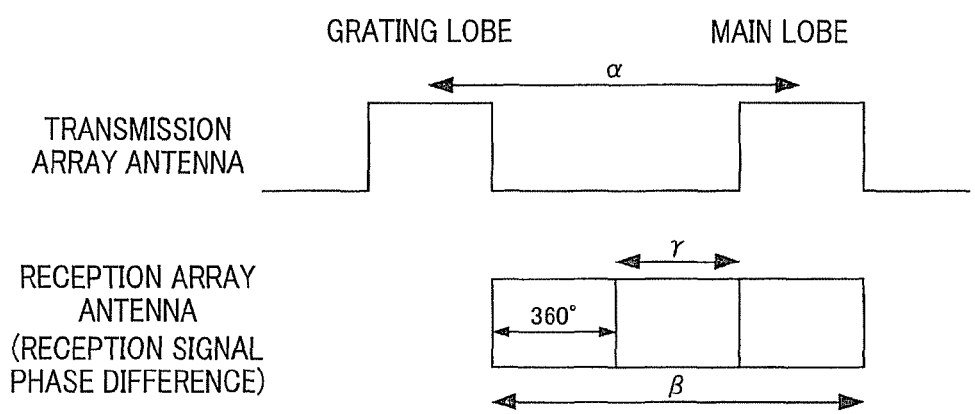
FIG. 2 is an explanatory diagram of a relationship among parameters required for setting placement spacing of antenna elements.

As shown in FIG. 2, the intervals d1 and d2 are set such that, with an azimuthal difference between a main lobe and a grating lobe of the transmission array antenna 2 as α and a range (referred to, hereinafter, as a "detection range") over which azimuth detection of a target can be performed in the radar device 1 as β, the azimuthal difference α is the detection range β or more. In other words, within the detection range β, the setting is such that the azimuth of the target can be detected without being affected by the grating lobe of the transmission array antenna 2.

In addition, with a unit azimuthal width that is an azimuthal width required for the phase difference between the respective reception signals $SR_1$ to $SR_N$ of the reception-side antenna elements $AR_1$ to $AR_N$ to change 360° (in other words, an azimuthal width enabling the azimuth of the target to be uniquely determined from the phase difference of the reception signals) as γ, the detection range β is set to γ multiplied by an integer "a" (a>1). In other words, the detection range β (=a×γ) is set such as to use phase aliasing amounting to "a" cycles. FIG. 2 is a schematic diagram of a relationship among the azimuthal difference α, the detection range β, and the unit azimuthal width γ, in an instance where "a"=3 and α=β.

Specifically, with the direction (angle in relation to a front surface direction) of the main lobe of the transmission array antenna 2 as θ, a wavelength of the radar wave as λ, using Expression (1) expressing a relationship between the interval d1 and the azimuthal difference α (see FIG. 3A and FIG. 3B) and Expression (2) expressing a relationship between the interval d2 and the azimuthal width γ, the intervals d1 and d2 can be determined from an expression in which the Expressions (1) and (2) are solved regarding the intervals d1 and d2.

$$d1 \cdot \sin(\theta \pm \alpha) - \lambda = d1 \sin\theta \quad (1)$$

$$\lambda = d2 \sin\gamma \quad (2)$$

Figure 3A:
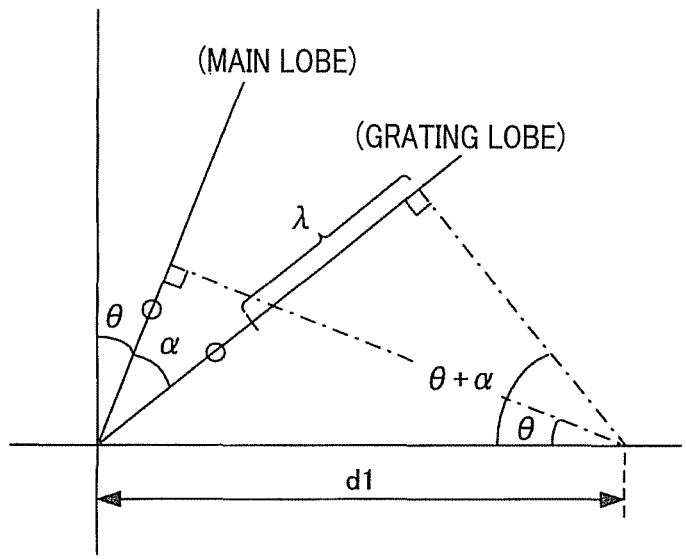
FIG. 3A and FIG. 3B are explanatory diagrams of a relationship between parameters required for setting placement spacing of antenna elements.
Figure 3B:
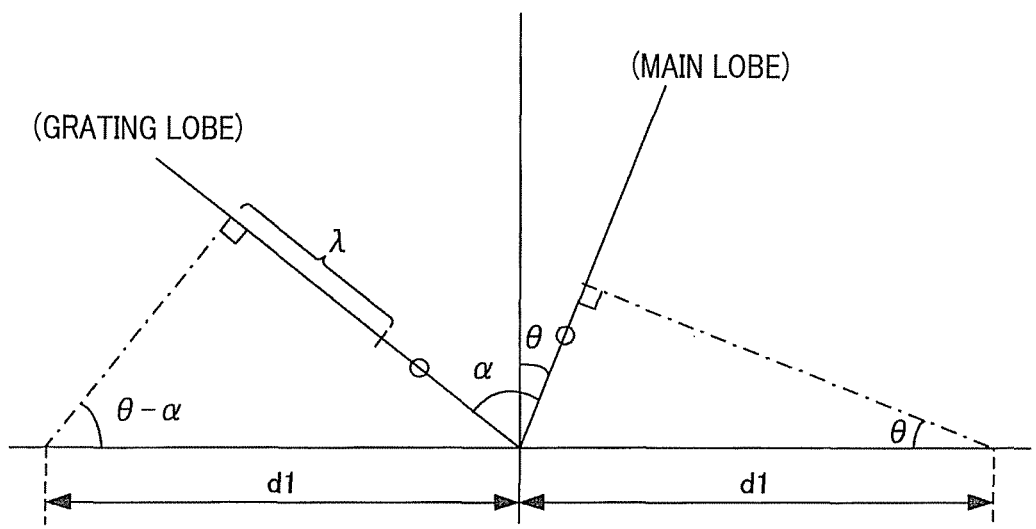

In Expression (1), the inside of the parentheses on the left side is positive in the instance in FIG. 3A, and is negative in the instance in FIG. 3B.

(Transmitter)

The transmitter 3 includes: a high-frequency oscillator 31 that generates millimeter-waveband high-frequency signals, and of which the oscillation frequency changes depending on a signal level of the modulation signal MD; a distributor 33 that performs power distribution of the output from the high-frequency oscillator 31 to the transmission signal ST and a local signal L; and a selector 32 that supplies the transmission signal ST to any of the transmission-side antenna elements $AT_1$ to $AT_N$ in adherence to a selection signal SE from the signal processor 8. The selector 32 responds to the selection signal SE which is given on a time sharing from the signal processor 8.

According to the present embodiment, a signal having a fixed signal level, and a signal of which the signal level changes in a triangular wave shape are used as the modulation signal MD. In the former instance, the radar wave becomes a continuous wave having a fixed frequency (CW), and in the latter instance, the radar wave becomes a frequency-modulated continuous wave (FM-CW).

(Receiver)

The receiver 6 is composed of high-frequency mixers $MX_1$ to $MX_N$ that respectively combine the local signal L with the reception signals $SR_1$ to $SR_N$ from the reception-side antenna elements $AR_1$ to $AR_N$ and generate the beat signals $B_1$ to $B_N$ that are frequency components of the difference between these signals; and amplifiers $AMP_1$ to $AMP_N$ that respectively amplify the generated beat signals $B_1$ to $B_N$.

Hereafter, a combination of a transmission-side antenna element $AT_m$ (m=1, 2, ... M) and a reception-side antenna element $AR_n$ (n=1, 2, ... N) is referred to as a channel $CH_{mn}$. A channel group composed of an N-number of channels $CH_{m1}$ to $CH_{mN}$ including the transmission-side antenna element $AT_m$ is referred to as a transmission-side fixed channel group, and a channel group composed of an M-number of channels $CH_{1n}$ to $CH_{Mn}$ including the reception-side antenna element $AR_n$ is referred to as the reception-side fixed channel group.

Furthermore, when $AT_m$ is selected as the transmission-side antenna element, the digital data generated based on the reception signal of the reception-side antenna element $AR_n$ is expressed by $D_{mn}$.

(Operations Other than that by the Signal Processor)

In the radar device 1 configured as described above, a radar wave is transmitted from any one of the transmission-side antenna element $AT_m$ selected by the selection signal SE, and a reflected wave of the radar wave is received by each reception-side antenna element $AR_1$ to $AR_N$. In addition, in the radar device 1, based on the N-number of reception signals $SR_1$ to $SR_N$ respectively outputted from the antenna elements $AR_1$ to $AR_N$, digital data $D_{m1}$ to $D_{mN}$ regarding the transmission-side fixed channel group $CH_{m1}$ to $CH_{mN}$ fixed to the transmission-side antenna element $AT_m$ are obtained.

When this operation is repeatedly performed while successively changing the transmission-side antenna element $AT_m$ used for radar-wave transmission by the selection signal SE, the digital data $D_{11}$ to $D_{MN}$ regarding all M× N-number of channels $CH_{11}$ to $CH_{MN}$ are obtained.

(Signal Processor)

The signal processor 8 is mainly configured by a known microcomputer composed of a central processing unit (CPU), a read-only memory (ROM), a random access memory (RAM), and the like. The signal processor 8 includes an input port for inputting data from the AD converter 7, a digital signal processor (DSP) for performing fast Fourier transform (FFT), and the like.

The signal processor 8 fixes one transmission-side antenna element $AT_m$ based on the selection signal SE (in other words, selects one transmission-side fixed channel group $CH_{m1}$ to $CH_{mN}$). The signal processor 8 also performs a target detecting process, an azimuth detecting process, and the like. In the target detecting process, a modulation signal MD such that the radar wave becomes a FM-CW is outputted. Every time a measurement period composed of upward modulation in which the frequency gradually rises and downward modulation in which the frequency gradually drops ends, a distance from the target that has reflected the radar wave and a relative speed are calculated based on the digital data $D_{m1}$ to $D_{mN}$ regarding the single transmission-side fixed channel group repeatedly sampled by the AD converter 7 during the measurement period. In the azimuth detecting process, a modulation signal MD such that the radar wave becomes a CW is outputted. The transmission-side antenna elements $AT_1$ to $AT_M$ are successively switched based on the selection signal SE, the digital data $D_{11}$ to $D_{MN}$ regarding all channels $CH_{11}$ to $CH_{MN}$ are acquired. The direction in which the target is present is detected based on the digital data $D_{11}$ to $D_{MN}$.

Of the processes, in the target detecting process, the signal processor 8 detects the target by identifying a frequency component based on the reflected wave from the target by, for example, performing FFT processing of the digital data $D_{m1}$ to $D_{mN}$ respectively acquired repeatedly in the N-number of channels $CH_{m1}$ to $CH_{mN}$ configuring the selected transmission-side fixed channel group, for each channel. For each detected target, the distance and the relative speed are calculated using a method known in the field of FMCW radars.

(Azimuth Detecting Process)

Figure 4:
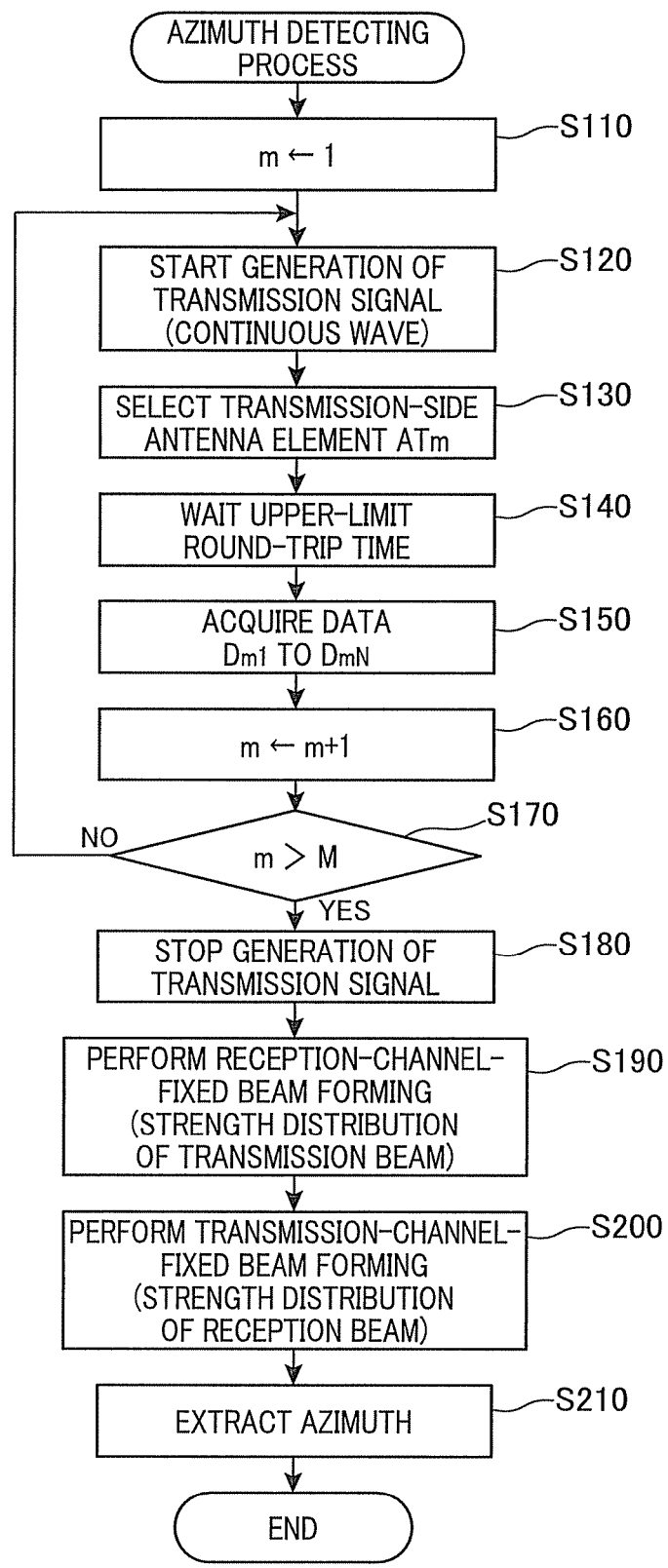
FIG. 4 is a flowchart of details of an azimuth detecting process performed by a signal processor.

Next, the azimuth detecting process related to the main sections of the present invention will be described with reference to a flowchart in FIG. 4.

The azimuth detecting process is started alternately with the target detecting process, or every time the target detecting process is performed a plurality of number of times.

When the azimuth detecting process is started, first, at S110, a parameter m designating the transmission-side antenna element AT is reset to 1. At S120, generation of a transmission signal that becomes a continuous wave (CW) is started by a modulation command CM being outputted to the DA converter 4, the modulation command CM enabling modulation signals MD of a fixed level to be outputted.

At S130, the setting signal SE is set such that the selector 33 selects the transmission-side antenna element AT in adherence to the setting of the parameter m under the time sharing manner. At S140, the radar device 1 waits an upper limit round-trip time (waiting period) set to an amount of time required for the radar wave to travel a maximum detection distance and back, or longer. At S150, the digital data $D_{m1}$ to $D_{mN}$ (in other words, the data for the transmission-side fixed channel group $CH_{m1}$ to $CH_{mN}$) are acquired via the AD converter 7.

At S160, the parameter m is incremented (m←m+1). At S170, whether or not the parameter m is greater than the number M of transmission-side antenna elements is judged. When judged that m is M or less, an unselected transmission-side antenna element (and thus, a transmission-side fixed channel group) is assumed to be present, and the processes at S130 to S160 are repeated.

At S170, when judged that m is greater than M, data is assumed to have been acquired for all transmission-side antenna elements (and thus, transmission-side fixed channel groups), and the process proceeds to S180. The output of the modulation command CM is stopped, thereby stopping generation of the transmission signal.

Figure 5:
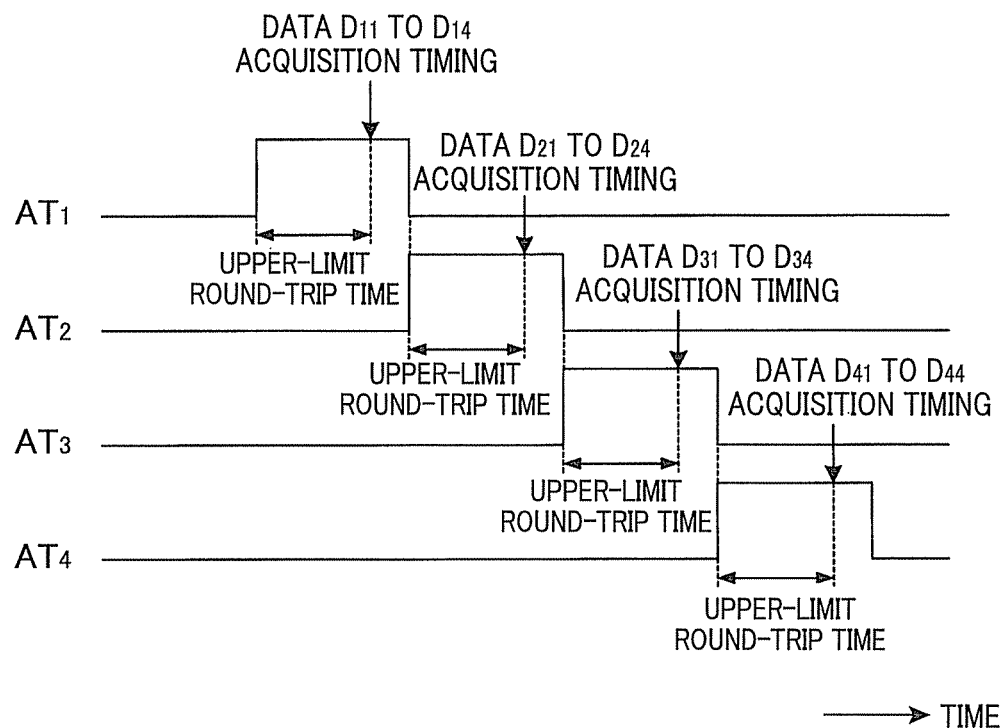
Figure 7:
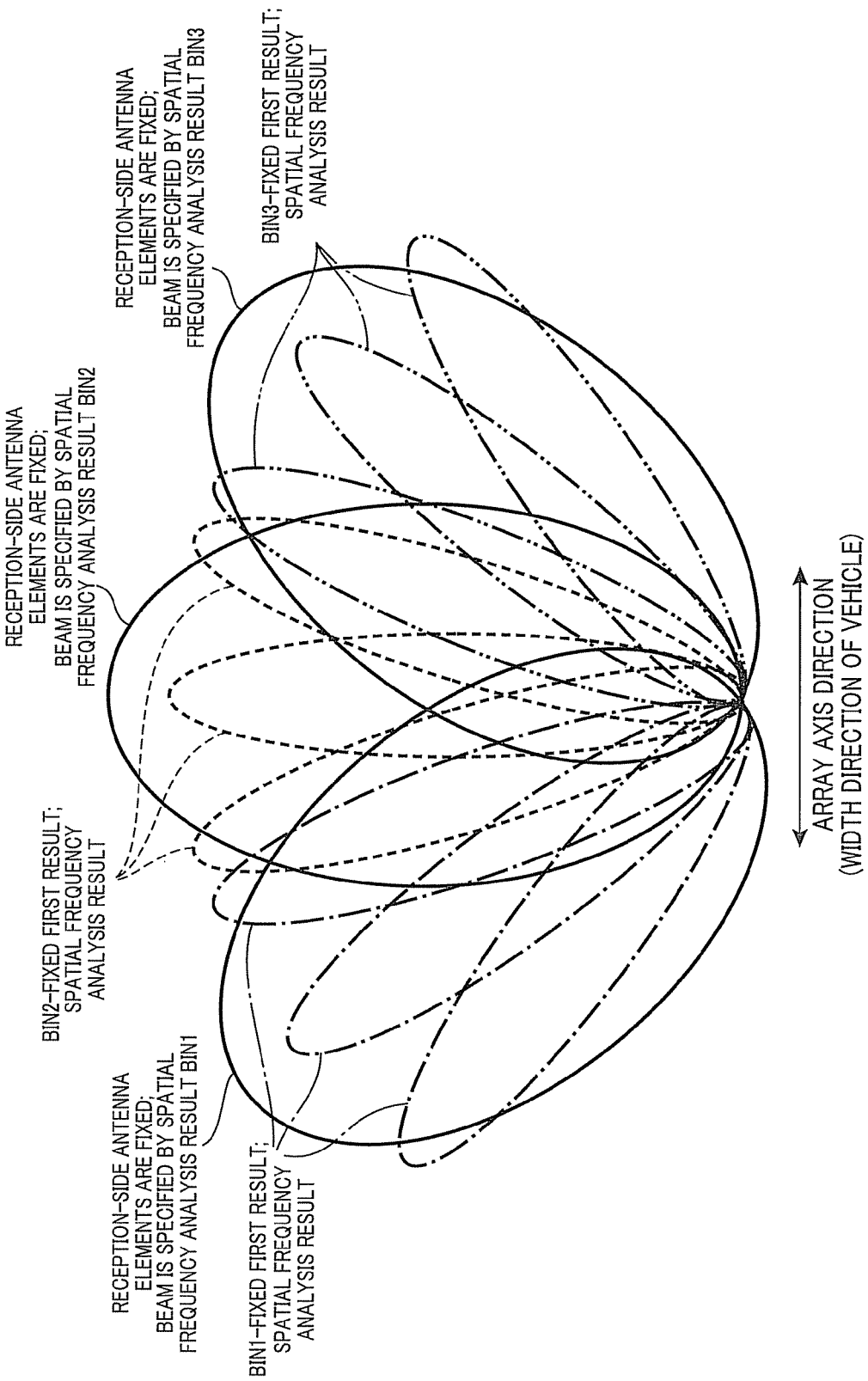
FIG. 7 is an explanatory diagram of an overview of beams formed by two-dimensional spatial frequency analysis.

In other words, as shown in FIG. 5, the transmission antennas $AT_1$ to $AT_M$ are successively selected, and a radar wave is transmitted from the selected transmission antenna. When a certain transmission antenna $AT_m$ is selected, after waiting the upper-limit round-trip time, the digital data for the channels $CH_{m1}$ to $CH_{mN}$ is acquired. As a result of this process being repeated for all transmission channels, the digital data for all channels is acquired.

At S190, beam forming (digital beam forming) is performed every M-number of channels $CH_1$ to $CH_{Mn}$ (in other words, the reception-side fixed channel groups $TG_1$ to $TG_N$; see FIG. 6A) having the same reception-side antenna element $AR_n$. As a result, for each of the N-number of reception-side channel groups $TG_1$ to $TG_N$, calculation results (frequency and strength) are obtained every M-number of frequency bins. In the calculation results, the frequency indicates the direction of each beam formed by the transmission array antenna (see areas indicated by solid lines in FIG. 7), and strength indicates reception strength of the beam.

At S200, from the calculation results obtained for each reception-side fixed channel group $TG_1$ to $TG_N$ at S190, beam forming is performed every N-number of calculation results (see FIG. 6B) regarding the same frequency bin (referred to, hereinafter, as "reception fixed frequency bin"). As a result, the calculation results (frequency and strength) are obtained every N-number of frequency bins, regarding each of the M-number of reception fixed frequency bins. In the calculation results, the frequency indicates a direction of each beam (however, see areas excluding areas indicated by solid lines in FIG. 7 within the transmission beam specified by the reception fixed frequency bin) formed by the receiving array antenna within the transmission beam specified by the reception fixed frequency bin, and strength indicates the reception strength of the beam.

In other words, from the calculation results at S200, reception strength distribution within the detection range β is acquired.

At S210, the direction in which the target is present is extracted (direction in which the reception strength is a threshold value set in advance or greater) from the reception strength distribution obtained at S200, and the azimuth detecting process is completed.

The azimuth information of the target acquired in this way, and the distance to the target and the relative speed acquired by the target detecting process, are used for control performed to avoid or notify a driver of dangerous situations during auto-cruise and vehicle running, and the like.

(Effects)

As described above, in the radar device 1, through use of the transmission array antenna 2 composed of an M-number of transmission-side antenna elements $AT_1$ to $AT_M$ and receiving array antenna 5 composed of an N-number of reception-side antenna elements $AR_1$ to $AR_N$, the digital data $D_{11}$ to $D_{MN}$ are acquired for all channels $CH_{11}$ to $CH_{MN}$ that are a combination of the transmission-side antenna element $AT_m$ and reception-side antenna element $AR_n$. Furthermore, as a result of two-dimensional spatial frequency analysis (beam forming) being performed on the digital data $D_{11}$ to $D_{MN}$ in the array direction of the transmission-side antenna elements and the array direction of the reception-side antenna elements, reception strength distribution is created, and the direction in which the target that has reflected the radar wave is present is determined from the reception strength distribution.

Therefore, in the radar device 1, as a result of beam forming in which the reception-side channel element is fixed, a process equivalent to transmission beam switching is actualized without use of a phase controller. Therefore, widening of the azimuth detection range can be actualized by a simple configuration.

In addition, in the radar device 1, because two-dimensional spatial frequency analysis is performed, effects equivalent to multiplication of the transmission beam and the reception beam, and thus, scanning using a narrowed beam, can be acquired, and accuracy of azimuth detection can be enhanced.

In addition, in the radar device 1, the placement spacing d1 of the transmission-side antenna elements $AT_1$ to $AT_M$ is set such that the azimuthal difference a between the main lobe and the grating lobe of the transmission array antenna 2 becomes the detection range β or more, and the placement spacing d2 of the reception-side antenna elements $AR_1$ to $AR_N$ are set such that the detection range β becomes the unit azimuthal width γ multiplied by "a".

Therefore, in the radar device 1, azimuth detection can be performing using the detection range β to its full potential, while suppressing the effect of the grating lobe of the transmission array antenna 2 (aliasing of a target outside of the detection range β) from appearing in the detection range β.

In addition, in the azimuth detecting device of the present invention, the transmission array antenna and the receiving array antenna may be configured by a single array antenna.

Second Embodiment

Figure 8:
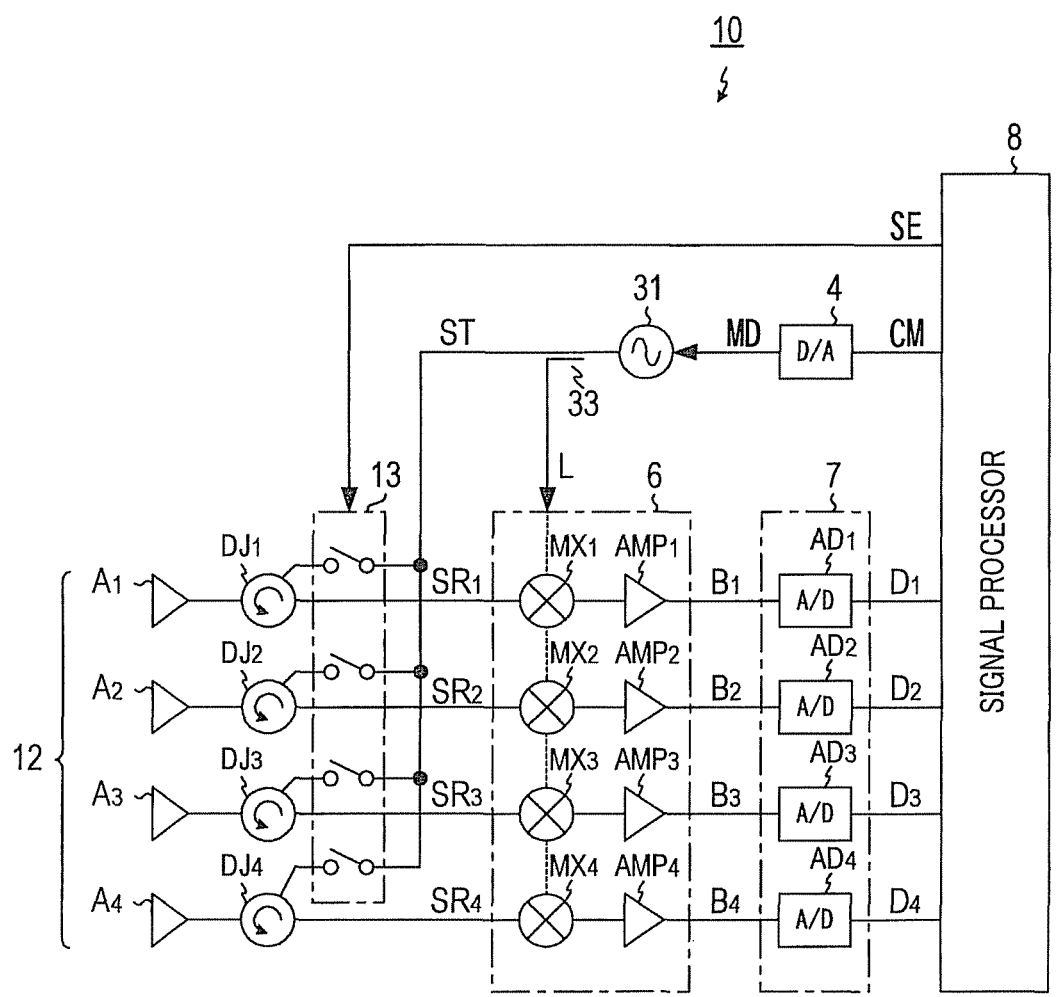
FIG. 8 is a block diagram of an overall configuration of a radar device according to a second embodiment.

Referring to FIG. 8, the azimuth detecting device according to a second embodiment of the present invention will now be described.

A radar device 10 according to the second embodiment differs only in part from the radar device 1 according to the first embodiment. The difference will mainly be described.

(Configuration)

As shown in FIG. 8, the radar device 10 includes a transmission/receiving array antenna 12 composed of an M-number (M=4 according to the second embodiment) of antenna elements $A_1$ to $A_M$ arrayed in a single row, instead of the transmission array antenna 2 and the receiving array antenna 5.

In addition, the radar device 10 includes, instead of the selector 33, directional couplers $DJ_1$ to $DJ_N$ respectively provided in the antenna elements $A_1$ to $A_N$, and a selector 13 that supplies the transmission signal ST to any of the directional couplers $DJ_1$ to $DJ_N$ (and thus, the antenna elements A1 to AN) in adherence to the selection signal SE from the signal processor 8.

In a manner similar to that of the transmission-side antenna elements $AT_1$ to $AT_M$ according to the first embodiment, the placement spacing of the antenna elements $A_1$ to $A_M$ is set such that the azimuthal difference a between the main lobe and the grating lobe of the array antenna 12 is the detection range β or more.

(Effects)

In the radar device 10 configured as described above, compared to the radar device 1, the size required for the antenna is halved, and further simplification of the configuration can be actualized.

Other Embodiments

Embodiments of the present invention are described above. However, the present invention is not limited to the above-described embodiments and various modifications can be made without departing from the scope of the present invention.

For example, according to the above-described embodiments, the transmission-side antenna elements $AT_1$ to $AT_M$, the reception-side antenna elements $AR_1$ to $AR_N$, the antenna elements $A_1$ to $A_M$ are each arrayed at equal intervals. However, the antenna elements may be unevenly spaced, i.e., arrayed at unequal (irregular) intervals. To set unequal spacing, a technique described in JP-A-2008-241702 publication may be used.

When the antenna elements are arrayed at uneven intervals, the azimuthal width required to change the phase difference by 360° differs for each antenna element combination. Therefore, generation of a grating lobe, and thus, the occurrence of aliasing can be suppressed.

However, when the antenna elements are arrayed at uneven intervals, calculation is required to be performed with the addition of a rotor that rotates in an inversely proportional manner to the antenna spacing, when the beam forming is performed.

According to the above-described embodiments, the detection range β is set to be the unit azimuthal width γ multiplied by the integer "a". However, with 1>a>0, the detection range β may be set to be narrower than the unit azimuthal width γ.

According to the above-described embodiments, a beam former is used for spatial frequency analysis. However, high-resolution processing, such as MUSIC may be used.

According to the above-described embodiments, the azimuth detecting process is performed by processing data acquired separately from the target detecting process. However, the azimuth detecting process may be performed using data acquired in the target detecting process.

According to the above-described embodiments, after a first spatial frequency analysis is performed for every reception-side fixed channel group with a fixed reception-side antenna element, a second spatial frequency analysis is performed for every frequency bin using the results from the first spatial frequency analysis. However, the first spatial frequency analysis may be performed for every transmission-side fixed channel group with a fixed transmission-side antenna element, and the second spatial frequency analysis may be performed for every frequency bin using the results from the first spatial frequency analysis.

For the sake of completeness, it should be mentioned that the various embodiments explained so far are not definitive lists of possible embodiments. The expert will appreciate that it is possible to combine the various construction details or to supplement or modify them by measures known from the prior art without departing from the basic inventive principle.

What is claimed is:

1. A device for detecting an azimuth viewed from the device which is present in a field, the device comprising:

a transmission array antenna having M-piece transmission antenna elements (M is an integer equal to or larger than 2) arrayed along an array axis set in advance and a receiving array antenna having N-piece receiving antenna elements (N is an integer equal to or larger than 2) arrayed along the array axis, wherein N×M-piece channels for transmission and reception are provided by combinations of each of the transmission antenna elements and each of the receiving antenna elements, wherein the transmission antenna elements are arrayed according to a first interval and the receiving antenna elements are arrayed according to a second interval, the first and second intervals being set such that an azimuthal difference between a main lobe and a grating lobe of a search wave transmitted from the transmission array antenna is equal to or larger than a detection range, the detection range being an azimuthal width within which the device is capable of detecting the azimuth and being set to either i) an amount which is a positive integral multiple of a unit azimuthal width through which the reception signals from mutually adjacent ones of the receiving antenna elements are given a phase difference of 360 degrees or ii) an amount which is narrower than the azimuthal width through which the reception signals from mutually adjacent ones of the receiving antenna elements are given the phase difference of 360 degrees;

means for repeatedly selecting a channel group among the channels, the selected channel group being either a first type of channel group or a second type of channel group, wherein the first type of channel group is provided as M-piece channel groups each consisting of N-piece channels, each of the M-piece channel groups being provided corresponding to the same M-piece transmission antenna elements, and the second type of channel group is provided as N-piece channel groups each consisting of M-piece channels, each of the N-piece channel groups being provided corresponding to the same N-piece reception antenna elements, means for acquiring a reception signal for the channels by transmitting the search wave and receiving a reflected search wave, every channel group selected repeatedly, through each of channels belonging to the channel group selected by the selecting means;

means for performing a first spatial frequency analysis with the acquired reception signals for all the channels, every channel group which is either the second type of channel group or the first type of channel group which has not been selected by the selecting means;

means for performing a second spatial frequency analysis with the same frequency bins of either each of the N-piece channel groups or each of the M-piece channel groups, the frequency bins resulting from the first spatial frequency analysis; and means for determining an azimuth of a target that has reflected the search signal in adherence to analysis results from the second spatial frequency analysis.

2. The device of claim 1, wherein the first interval according to which the transmission antenna elements are arrayed consists of equal intervals along the array axis and the second interval according to which the receiving antenna elements are arrayed consists of equal intervals along the array axis.

3. The device of claim 1, wherein the first interval according to which the transmission antenna elements are arrayed consists of uneven intervals and the second interval according to which the receiving antenna elements are arrayed consists of uneven intervals.

4. The device of claim 3, wherein the transmission array antenna and the receiving array antenna are produced as a single array antenna.

5. The device of claim 4, wherein the acquiring means includes means for allowing the transmission antenna elements to operate under a time sharing technique.

6. The device of claim 5, wherein the acquiring means includes means for having a waiting period between switchovers of the channels accompanied by switchovers of the transmission antenna elements, the waiting period being set to be longer than a time period required for the search wave to travel a predetermined maximum detection distance and back.

7. The device of claim 6, wherein the first and second spatial frequency analyses are performed based on either beam-forming processing or high-resolution processing.

8. The device of claim 1, wherein the transmission array antenna and the receiving array antenna are produced as a single array antenna.

9. The device of claim 8, wherein the acquiring means includes means for allowing the transmission antenna elements to operate under a time sharing technique.

10. The device of claim 9, wherein the acquiring means includes means for having a waiting period between switchovers of the channels accompanied by switchovers of the transmission antenna elements, the waiting period being set to be longer than a time period required for the search wave to travel a predetermined maximum detection distance and back.

11. The device of claim 10, wherein the first and second spatial frequency analyses are performed based on either beam-forming processing or high-resolution processing.

12. The device of claim 2, wherein the transmission array antenna and the receiving array antenna are produced as a single array antenna.

13. The device of claim 12, wherein the acquiring means includes means for allowing the transmission antenna elements to operate under a time sharing technique.

14. The device of claim 13, wherein the acquiring means includes means for having a waiting period between switchovers of the channels accompanied by switchovers of the transmission antenna elements, the waiting period being set to be longer than a time period required for the search wave to travel a predetermined maximum detection distance and back.

15. The device of claim 1, wherein the acquiring means includes means for allowing the transmission antenna elements to operate under a time sharing technique.

16. The device of claim 15, wherein the acquiring means includes means for having a waiting period between switchovers of the channels accompanied by switchovers of the transmission antenna elements, the waiting period being set to be longer than a time period required for the search wave to travel a predetermined maximum detection distance and back.

17. A method of detecting an azimuth viewed from a device which is present in a field, the device comprising a transmission array antenna having M-piece transmission antenna elements (M is an integer equal to or larger than 2) arrayed along an array axis set in advance and a receiving array antenna having N-piece receiving antenna elements (N is an integer equal to or larger than 2) arrayed along the array axis, wherein N×M-piece channels for transmission and reception being provided by combinations of each of the transmission antenna elements and each of the receiving antenna elements, a channel group being selected repeatedly among the channels, the selected channel group being either a first type of channel group or a second type of channel group, the transmission antenna elements are arrayed according to a first interval and the receiving antenna elements being arrayed according to a second interval, the first and second intervals being set such that an azimuthal difference between a main lobe and a grating lobe of a search wave transmitted from the transmission array antenna is equal to or larger than a detection range, the detection range being an azimuthal width within which the device is capable of detecting the azimuth and being set to either i) an amount which is a positive integral multiple of a unit azimuthal width through which the reception signals from mutually adjacent ones of the receiving antenna elements are given a phase difference of 360 degrees or ii) an amount which is narrower than the azimuthal width through which the reception signals from mutually adjacent ones of the receiving antenna elements are given the phase difference of 360 degrees, wherein the first type of channel group is provided as M-piece channel groups each consisting of N-piece channels, each of the M-piece channel groups being provided corresponding to the same M-piece transmission antenna elements, and the second type of channel group is provided as N-piece channel groups each consisting of M-piece channels, each of the N-piece channel groups being provided corresponding to the same N-piece reception antenna elements, the method comprising:

acquiring a reception signal for the channels by transmitting the search wave and receiving a reflected search wave, every channel group selected repeatedly, through each of the channels belonging to the selected channel group;

performing a first spatial frequency analysis with the acquired reception signals for all the channels, every channel group which is either the second type of channel group or the first type of channel group which has not been selected in the selecting step;

performing a second spatial frequency analysis with the same frequency bins of either each of the N-piece channel groups or each of the M-piece channel groups, the frequency bins resulting from the first spatial frequency analysis; and determining an azimuth of a target that has reflected the search signal in adherence to analysis results from the second spatial frequency analysis.

* * * * *